United States Patent
Sentner, Jr.

[19]

[11] Patent Number: 6,003,350
[45] Date of Patent: Dec. 21, 1999

[54] LOCK FOR AN AUTOMOTIVE TRANSMISSION OF A VEHICLE HAVING A CENTER CONSOLE WITH A FLOOR MOUNTED GEAR SHIFT SELECTOR LEVER

[76] Inventor: Henry Sentner, Jr., 35 Preston St. 5f, Wakefield, Mass. 01880

[21] Appl. No.: 09/224,927

[22] Filed: Dec. 31, 1998

[51] Int. Cl.$^6$ .................................................. B60R 25/06
[52] U.S. Cl. ............................................... 70/202; 70/247
[58] Field of Search .............................. 70/245–248, 237, 70/238, 198–203, 211, 212

[56] References Cited

U.S. PATENT DOCUMENTS

| | | | |
|---|---|---|---|
| 1,165,352 | 12/1915 | Whiteside | 70/202 |
| 1,258,630 | 3/1918 | Cornall | 70/202 |
| 1,362,377 | 12/1920 | Weidner | 70/203 |
| 1,494,717 | 5/1924 | Sell | 70/203 |
| 3,822,573 | 7/1974 | Meyers | 70/238 X |
| 4,030,323 | 6/1977 | Stanislawczyk | 70/199 |
| 4,208,026 | 6/1980 | Reynolds | 70/212 X |
| 4,231,241 | 11/1980 | Lipski | 70/195 |
| 4,693,099 | 9/1987 | Cykman | 70/247 |
| 4,825,670 | 5/1989 | Snow | 70/203 X |
| 4,825,671 | 5/1989 | Wu | 70/211 X |
| 4,936,120 | 6/1990 | Fiks | 70/238 X |
| 4,972,693 | 11/1990 | Inouye | 70/238 |
| 4,995,250 | 2/1991 | Chiou | 70/238 |
| 5,020,344 | 6/1991 | Garcia | 70/245 |
| 5,038,667 | 8/1991 | Slater | 70/238 X |
| 5,277,043 | 1/1994 | Inashvili | 70/238 |
| 5,325,688 | 7/1994 | Jaw-Jia | 70/238 X |
| 5,345,796 | 9/1994 | Chieh et al. | 70/237 X |
| 5,400,626 | 3/1995 | Villani | 70/202 X |
| 5,454,244 | 10/1995 | Liou | 70/247 |
| 5,724,838 | 3/1998 | Alicea | 70/238 X |
| 5,784,907 | 7/1998 | Hu et al. | 70/247 X |

FOREIGN PATENT DOCUMENTS

| | | | |
|---|---|---|---|
| 925217 | 8/1947 | France | 70/238 |
| 1107012 | 3/1968 | United Kingdom | 70/238 |
| 2214885 | 9/1989 | United Kingdom | 70/247 |
| WO90/09911 | 9/1990 | WIPO | 70/238 |

*Primary Examiner*—Lloyd A. Gall
*Attorney, Agent, or Firm*—Richard L. Miller

[57] ABSTRACT

A lock for an automatic transmission of a vehicle having a center console with a pair of side walls and a floor mounted gear shift selector lever. The lock includes a fixed portion, a movable portion, and locking apparatus. The fixed portion replaceably attaches to the center console of the vehicle. The movable portion is movably mounted to the fixed portion and selectively engages the floor mounted gear shift selector lever of the vehicle. The locking apparatus is disposed on the fixed portion and selectively prevents movement of the movable portion. The key lock of the locking apparatus, by use of a key, locking engages a plurality of notches in a first member of the movable portion and prevents movement of the movable portion relative to the fixed portion when the fixed portion is engaged with the center console of the vehicle, the floor mounted gear shift selector lever of the vehicle is in park, and the moveable portion is extended from the fixed portion until a pair of prongs of a fork of the movable portion engage the floor mounted gear shift selector lever of the vehicle therebetween and prevent movement thereof.

3 Claims, 1 Drawing Sheet

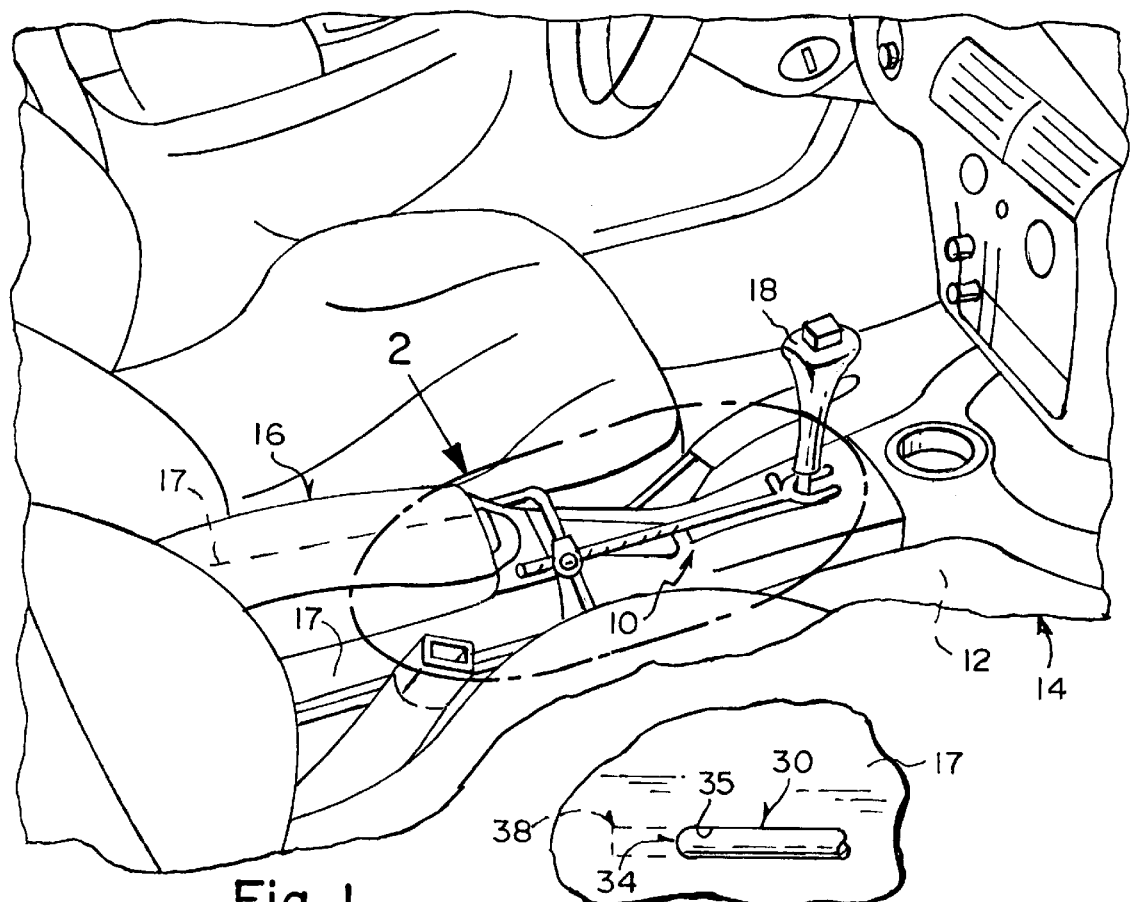
Fig. 1
Fig. 3
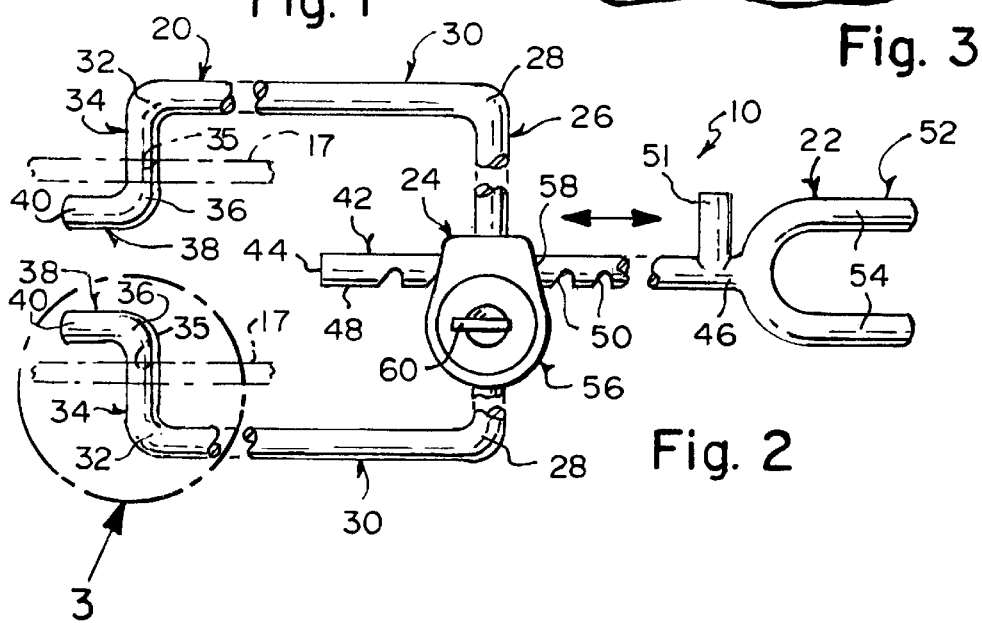
Fig. 2

LOCK FOR AN AUTOMOTIVE TRANSMISSION OF A VEHICLE HAVING A CENTER CONSOLE WITH A FLOOR MOUNTED GEAR SHIFT SELECTOR LEVER

BACKGROUND OF THE INVENTION

1. Field of the Invention

The present invention relates to a lock for a transmission of a vehicle. More particularly, the present invention relates to a lock for an automatic transmission of a vehicle having a center console with a floor mounted gear shift selector lever.

2. Description of the Prior Art

Numerous innovations for vehicle transmission locks have been provided in the prior art that will be described. Even though these innovations may be suitable for the specific individual purposes to which they address, however, they differ from the present invention.

A FIRST EXAMPLE, U.S. Pat. No. 4,030,323 to Stanislawczyk teaches a lock plate assembly that mounts about a pair of transmission gear shift levers of a vehicle to prevent unauthorized use of the vehicle. The lock plate assembly consists of a pair of shaped plates which are shaped to matingly engage with each other, with each plate shaped to fit halfway about two parallel cylindrical rods. An accessory assembly may be mounted to the vehicle floor to permit mounting the lock plate assembly about a shaft on the accessory plate and about one transmission gear shift lever of a vehicle, when so desired.

A SECOND EXAMPLE, U.S. Pat. No. 4,231,241 Lipski teaches a locking device for preventing the theft of certain vehicles equipped with automatic transmissions. The device is designed to mount on the shift lever of certain types of automatic transmissions and prevent shifting out of the PARK position, thus preventing theft of the automobile, even though the engine may be started by unauthorized means. The device is readily attachable to automatic transmission shift levers of the type for which it is designed, cannot be removed without a key, is positive in operation so as to prevent shifting of the transmission when locked, is simple and economical to manufacture, and is reliable and effective in preventing unauthorized operation of a vehicle.

A THIRD EXAMPLE, U.S. Pat. No. 4,693,099 Cykman teaches a locking arrangement for preventing motorcar theft by locking the gearshift stick to a fixed portion of the motorcar including a rigid bar rigidly secured to a body portion of the motorcar in the vicinity of, parallel to and of a length shorter than the gearshift stick, a padlock body fixedly mounted onto the bar, and a separable padlock shackle adapted to be locked to the padlock body, with the stick enclosed by the shackle.

A FOURTH EXAMPLE, U.S. Pat. No. 5,020,344 Garcia teaches an automobile anti-theft device having a locking rod that locks the parking lock pawl of an automatic transmission in a position where it engages and locks a parking pawl gear. The locking rod is spring biassed so that it automatically becomes engaged when the automatic transmission is placed into Park. A separate lever is actuated and used to withdraw the locking rod from locking the pawl. The locking rod is provided with a transverse groove to prevent unlocking of the transmission except when the transmission is in Park. The device is also provided with an electric switch and regulator which is operatively coupled to the locking rod as it electrically connected between the fuel injectors and the car's computer.

A FIFTH EXAMPLE, U.S. Pat. No. 5,454,244 Liou teaches a lock device for locking a gearshift stick of a vehicle so as to prevent the gearshift stick from being operated that includes a base having two holes for receiving two legs of a shackle, two catches slidably received in the base for locking the shackle, and a lock engaged in the base and having two plungers for actuating the catches. A housing is fixed on the base and has two channels for receiving the shackle, two resilient members are disposed in the channels for engaging with the shackle so as to retain the shackle in place. The housing has a key hole access for inserting a key into the key hole of the lock, and a lid is pivotally coupled in the housing for enclosing the key hole access.

It is apparent that numerous innovations for vehicle transmission locks have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a lock for an automatic transmission of a vehicle having a center console with a floor mounted gear shift selector lever that avoids the disadvantages of the prior art.

ANOTHER OBJECT of the present invention is to provide a lock for an automatic transmission of a vehicle having a center console with a floor mounted gear shift selector lever that is simple and inexpensive to manufacture.

STILL ANOTHER OBJECT of the present invention is to provide a lock for an automatic transmission of a vehicle having a center console with a floor mounted gear shift selector lever that is simple to use.

BRIEFLY STATED, YET ANOTHER OBJECT of the present invention is to provide a lock for an automatic transmission of a vehicle having a center console with a pair of side walls and a floor mounted gear shift selector lever. The lock includes a fixed portion, a movable portion, and locking apparatus. The fixed portion replaceably attaches to the center console of the vehicle. The movable portion is movably mounted to the fixed portion and selectively engages the floor mounted gear shift selector lever of the vehicle. The locking apparatus is disposed on the fixed portion and selectively prevents movement of the movable portion. The key lock of the locking apparatus, by use of a key, lockingly engages a plurality of notches in a first member of the movable portion and prevents movement of the movable portion relative to the fixed portion when the fixed portion is engaged with the center console of the vehicle, the floor mounted gear shift selector lever of the vehicle is in park, and the moveable portion is extended from the fixed portion until a pair of prongs of a fork of the movable portion engage the floor mounted gear shift selector lever of the vehicle therebetween and prevent movement thereof.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 a diagrammatic perspective view of the present invention in use;

FIG. 2 is an enlarged diagrammatic top plan view of the area generally enclosed by the dotted ellipse identified by arrow 2 in FIG. 1; and FIG. 3 is an enlarged diagrammatic side elevational view of the area generally enclosed by the dotted ellipse identified by arrow 3 in FIG. 2.

LIST OF REFERENCE NUMERALS UTILIZED IN THE DRAWING 10 lock for an automatic transmission of a vehicle having a center console with a floor mounted gear shift selector lever of the present invention
12 automatic transmission of vehicle 14
14 vehicle
16 center console of vehicle 14
17 pair of side walls of center console 16 of vehicle 14
18 floor mounted gear shift selector lever of vehicle 14
20 fixed portion for replaceably attaching to center console 16 of vehicle 14
22 movable portion for selectively engaging floor mounted gear shift selector lever 18 of vehicle 14
24 locking apparatus
26 first member of fixed portion 20 for extending transversely to, and in front of, pair of side walls 17 of center console 16 of vehicle 14
28 pair of ends of first member 26 of fixed portion 20
30 pair of second members of fixed portion 20 for extending, respectively, along pair of side walls 17 of center console 16 of vehicle 14
32 pair of ends of pair of second members 30 of fixed portion 20
34 pair of first stub members of fixed portion 20 for extending, respectively, replaceably inwardly through pair of elongated and horizontally-oriented throughslots 35 in pair of side walls 17 of center console 16 of vehicle 14
35 pair of elongated and horizontally-oriented throughslots in pair of side walls 17 of center console 16 of vehicle 14
36 pair of ends of pair of first stub members 34 of fixed portion 20
38 pair of second stub members of fixed portion 20 for extending, respectively, rearward along pair of side walls 17 of center console 16 of vehicle 14, inside center console 16 of vehicle 14
40 pair of free ends of pair of second stub members 38 of fixed portion 20
42 first member of movable portion 22 for extending in front of center console 17 of vehicle 14
44 free end of first member 42 of movable portion 22
46 second end of first member 42 of movable portion 22
48 longitudinal side of first member 42 of movable portion 22
50 plurality of notches in first member 42 of movable portion 22
51 projection of first member 42 of movable portion 22
52 fork of movable portion 22
54 pair of prongs defining fork 52 of movable portion 22 for engaging floor mounted gear shift selector lever 18 of vehicle 14 therebetween
56 key lock of locking apparatus 24
58 throughbore in key lock 56 of locking apparatus 24
60 key of locking apparatus 24

DETAILED DESCRIPTION OF THE PREFERRED EMBODIMENT

Referring now to the figures, in which like numerals indicate like parts, and particularly to FIG. 1, the lock for an automatic transmission of a vehicle having a center console with a floor mounted gear shift selector lever of the present invention is shown generally at 10 for an automatic transmission 12 of a vehicle 14 having a center console 16 with a pair of side walls 17 and a floor mounted gear shift selector lever 18.

The configuration of the lock for an automatic transmission of a vehicle having a center console with a floor mounted gear shift selector lever 10 can best be seen in FIGS. 2 and 3, and as such, will be discussed with reference thereto.

The lock for an automatic transmission of a vehicle having a center console with a floor mounted gear shift selector lever 10 comprises a fixed portion 20 for replaceably attaching to the center console 16 of the vehicle 14.

The lock for an automatic transmission of a vehicle having a center console with a floor mounted gear shift selector lever 10 further comprises a movable portion 22 movably mounted to the fixed portion 20 for selectively engaging the floor mounted gear shift selector lever 18 of the vehicle 14.

The lock for an automatic transmission of a vehicle having a center console with a floor mounted gear shift selector lever 10 further comprises locking apparatus 24 disposed on the fixed portion 20 and selectively preventing movement of the movable portion 22.

The fixed portion 20 is tubular, coplanar, and integral, and comprises a first member 26 that is straight for extending transversely to, and in front of, the pair of side walls 17 of the center console 16 of the vehicle 14, and has a pair of ends 28.

The fixed portion 20 further comprises a pair of second members 30 that are straight and extend perpendicularly rearwardly, respectively, from the pair of ends 28 of the first member 26 of the fixed portion 20 to a pair of ends 32 and for extending, respectively, along the pair of side walls 17 of the center console 16 of the vehicle 14.

The fixed portion 20 further comprises a pair of first stub members 34 that are straight and extend perpendicularly inwardly, respectively, from the pair of ends 32 of the pair of second members 30 of the fixed portion 20 to a pair of ends 36 and for extending, respectively, replaceably inwardly through a pair of elongated and horizontally-oriented throughslots 35 in the pair of side walls 17 of the center console 16 of the vehicle 14.

The fixed portion 20 further comprises a pair of second stub members 38 that are straight and extend perpendicularly rearwardly, respectively, from the pair of ends 36 of the pair of first stub members 34 of the fixed portion 20 to a pair of free ends 40 and for extending, respectively, rearward along the pair of side walls 17 of the center console 16 of the vehicle 14, inside the center console 16 of the vehicle 14.

The movable portion 22 is tubular, coplanar, and integral, and comprises a first member 42 that is straight and extends from a free end 44 perpendicularly movably across the first member 26 of the fixed portion 20 to a second end 46 and for extending in front of the center console 17 of the vehicle 14, and has a longitudinal side 48.

The first member 42 of the movable portion 22 has a plurality of notches 50 that are spaced-apart and extend along the longitudinal side 48 of the first member 42 of the movable portion 22.

The first member 42 of the movable portion 22 further comprises a projection 51 that extends perpendicularly outwardly from the second end 46 of the first member 42 of the movable portion 22 for grabbing by a user and assisting in moving the movable portion 22 relative to the fixed portion 20.

The movable portion 22 further comprises a fork 52 defined by a pair of prongs 54 that extend parallelly from the second end 46 of the first member 42 of the movable portion 22 for engaging the floor mounted gear shift selector lever 18 of the vehicle 14 therebetween.

The locking apparatus 24 comprises a key lock 56 that is fixedly disposed on the first member 26 of the fixed portion 20.

The key lock 56 of the locking apparatus 24 has a throughbore 58 that movably receives the first member 42 of the movable portion 22, with the key lock 56 of the locking apparatus 24, by use of a key 60, lockingly engaging the plurality of notches 50 in the first member 42 of the movable portion 22 and preventing movement of the movable portion 42 relative to the fixed portion 20 when the fixed portion is engaged with the center console 16 of the vehicle 14, the floor mounted gear shift selector lever 18 of the vehicle 18 is in park, and the moveable portion 22 is extended from the fixed portion 20 until the pair of prongs 54 of the fork 52 of the movable portion 22 engage the floor mounted gear shift selector lever 18 of the vehicle 14 therebetween and prevent movement thereof.

It will be understood that each of the elements described above, or two or more together, may also find a useful application in other types of constructions differing from the types described above.

While the invention has been illustrated and described as embodied in a lock for a transmission of a vehicle having a center console with a floor mounted gear shift selector lever, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A lock for an automatic transmission of a vehicle having a center console with a pair of side walls and a floor mounted gear shift selector lever, said lock comprising:

a) a fixed portion for replaceably attaching to the center console of the vehicle;

b) a movable portion movably mounted to said fixed portion for selectively engaging the floor mounted gear shift selector lever of the vehicle; and c) locking apparatus disposed on said fixed portion and selectively preventing movement of said movable portion, wherein said fixed portion is coplanar, and integral, and comprises a first member that is straight for extending transversely to, and in front of, the pair of side walls of the center console of the vehicle, and has a pair of ends, wherein said fixed portion further comprises a pair of second members that are straight and extend perpendicularly rearwardly, respectively, from said pair of ends of said first member of said fixed portion to a pair of ends, and for extending, respectively, along the pair of side walls of the center console of the vehicle.

2. The lock as defined in claim 1, wherein said fixed portion further comprises a pair of first stub members that are straight and extend perpendicularly inwardly, respectively, from said pair of ends of said pair of second members of said fixed portion to a pair of ends, and for extending, respectively, replaceably inwardly through a pair of elongated and horizontally-oriented throughslots in the pair of side walls of the center console of the vehicle.

3. The lock as defined in claim 2, wherein said fixed portion further comprises a pair of second stub members that are straight and extend perpendicularly rearwardly, respectively, from said pair of ends of said pair of first stub members of said fixed portion to a pair of free ends, and for extending, respectively, rearward along the pair of side walls of the center console of the vehicle, inside the center console of the vehicle.

\* \* \* \* \*